(12) United States Patent
Hinami

(10) Patent No.: US 11,046,118 B2
(45) Date of Patent: Jun. 29, 2021

(54) TIRE FOR TWO-WHEEL VEHICLE

(71) Applicant: Sumitomo Rubber Industries, Ltd., Kobe (JP)

(72) Inventor: Yukiko Hinami, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 223 days.

(21) Appl. No.: 15/903,984

(22) Filed: Feb. 23, 2018

(65) Prior Publication Data
US 2018/0264888 A1 Sep. 20, 2018

(30) Foreign Application Priority Data
Mar. 17, 2017 (JP) .............................. JP2017-052887

(51) Int. Cl.
*B60C 11/11* (2006.01)
*B60C 11/03* (2006.01)
*B60C 11/13* (2006.01)

(52) U.S. Cl.
CPC ............ *B60C 11/11* (2013.01); *B60C 11/032* (2013.01); *B60C 11/0302* (2013.01); *B60C 11/0306* (2013.01); *B60C 2011/1361* (2013.01); *B60C 2200/10* (2013.01); *B60C 2200/14* (2013.01)

(58) Field of Classification Search
CPC ..... B60C 2011/1361; B60C 2011/1338; B60C 11/1369; B60C 2200/10; B60C 2200/14; B60C 2200/12; B60C 11/11; B60C 11/032
See application file for complete search history.

(56) References Cited

U.S. PATENT DOCUMENTS

| 2010/0236678 A1 | 9/2010 | Sueishi | |
|---|---|---|---|
| 2011/0308681 A1* | 12/2011 | Nakamura | B60C 11/032 152/209.18 |
| 2016/0075186 A1* | 3/2016 | Tamura | B60C 11/11 152/209.11 |

FOREIGN PATENT DOCUMENTS

| DE | 19548733 A1 | 6/1997 |
|---|---|---|
| EP | 2374636 A1 | 10/2011 |
| JP | 2009-67245 A | 4/2009 |

OTHER PUBLICATIONS

Extended European Search Report for European Application No. 18156882.5 dated Jul. 20, 2018.
Sturgeon, "Heidenau K60," #474, XP055490690, retrieved from URL:https://advrider.com/index.php?threads/heidenau-k60.568324/page-24, Feb. 8, 2011, 1 page.

* cited by examiner

*Primary Examiner* — Marc C Howell
*Assistant Examiner* — John J DeRusso
(74) *Attorney, Agent, or Firm* — Birch, Stewart, Kolasch & Birch, LLP

(57) ABSTRACT

A tire for two-wheel vehicle includes a tread portion having a designated rotation direction and being provided with a plurality of blocks and grooves. The plurality of blocks includes at least one V-shaped block having an axial center portion located rearwardly in the rotation direction with respect to its axial both end portions and a first sidewall located rearwardly in the rotation direction. The grooves include a groove bottom surface connected to the first sidewall, wherein the groove bottom surface is provided with ribs extending in a tire circumferential direction.

16 Claims, 6 Drawing Sheets

TIRE FOR TWO-WHEEL VEHICLE

BACKGROUND ART

Field of the Invention

The present disclosure relates to a tire for two-wheel vehicle having a plurality of tread blocks.

Description of the Related Art

Conventionally, as for tires for two-wheel vehicle adequate for off-road, tires having a plurality of tread blocks have been known. For example, Japanese Unexamined Patent Application Publication 2009-067245 discloses a tire for two-wheel vehicle which includes V-shaped blocks each having a center portion in the tire axial direction located rearwardly in a rotation direction of its both end portions in the tire axial direction. The tire as such exhibits better driving performance on soft terrain, e.g., sand, mud and the like.

Unfortunately, in the above tire disclosed by the patent publication, the V-shaped blocks tend to deform easily rearwadly upon grounding so that base portions of the V-shaped blocks tend to receive large strain. Then, large strain as such results in chipping away of one or some of the V-shaped blocks, thereby deteriorating durability of the tire for two-wheel vehicle.

SUMMARY OF THE INVENTION

The present disclosure has been made in view of the above circumstances and has an object to provide a tire for two-wheel vehicle capable of improving driving performance and durability in a well-balanced manner.

In accordance with one aspect of the disclosure, a tire for two-wheel vehicle, the tire includes a tread portion having a designated rotation direction and being provided with a plurality of blocks and grooves. The plurality of blocks includes at least one V-shaped block having an axial center portion located rearwardly in the rotation direction with respect to its axial both end portions and a first sidewall located rearwardly in the rotation direction. The grooves include a groove bottom surface connected to the first sidewall, wherein the groove bottom surface is provided with ribs extending in a tire circumferential direction.

In another aspect of the disclosure, the at least one V-shaped block may further include a keel portion projecting rearwardly in the rotation direction from the center portion, and the ribs may be arranged such that one or some of the ribs exist on each side of the keel portion in a tire axial direction.

In another aspect of the disclosure, the ribs may include at least six ribs on the groove bottom surface.

In another aspect of the disclosure, the ribs each may include one end terminating on the groove bottom surface.

In another aspect of the disclosure, the ribs each may include a top surface in a tire radial direction extending from a front end to a rear end in the rotation direction, and the top surface may extend in a straight manner connecting the front end and the rear end.

In another aspect of the disclosure, the top surface may extend inwardly in the tire radial direction with respect to a virtual plane connecting the front end and the rear end.

In another aspect of the disclosure, the at least one V-shaped block may further include a second sidewall located forwardly in the rotation direction, the at least one V-shaped block may include a pair of V-shaped blocks spaced in the tire circumferential direction through the groove bottom surface, and the ribs may be arranged to connect the first sidewall and the second sidewall between the pair of V-shaped blocks.

In another aspect of the disclosure, the ribs, which are arranged between the pair of V-shaped blocks, each may include a top surface in a tire radial direction extending from a front end to a rear end in the rotation direction, and the top surface may extend in a straight manner connecting the front end and the rear end.

In another aspect of the disclosure, the ribs, which are arranged between the pair of V-shaped blocks, the top surface may extend inwardly in the tire radial direction with respect to a virtual plane connecting the front end and the rear end.

In another aspect of the disclosure, the ribs each may have a maximum height from the groove bottom surface in a range of from 5% to 30% of a height of the V-shaped blocks from the groove bottom surface.

In another aspect of the disclosure, the plurality of blocks may include crown blocks located on a crown region of the tread portion, and the crown blocks each may be configured as said V-shaped block.

In another aspect of the disclosure, the plurality of blocks may include a pair of middle block rows each including middle blocks arranged outwardly in the tire axial direction on both sides of the crown blocks and a pair of shoulder block rows each including shoulder blocks arranged outwardly in the tire axial direction of the respective middle block rows. With respect to each of the crown blocks, a pair of middle blocks which are arranged nearest to the concerned crown block may be located forwardly in the rotation direction of the concerned crown block. With respect to each of the middle blocks, one shoulder block arranged nearest to the concerned middle block may be located forwardly in the rotation direction of the concerned middle block.

DESCRIPTION OF THE PREFERRED EMBODIMENTS

An embodiment of the present disclosure will be explained below with reference to the accompanying drawings.

Figure 1:
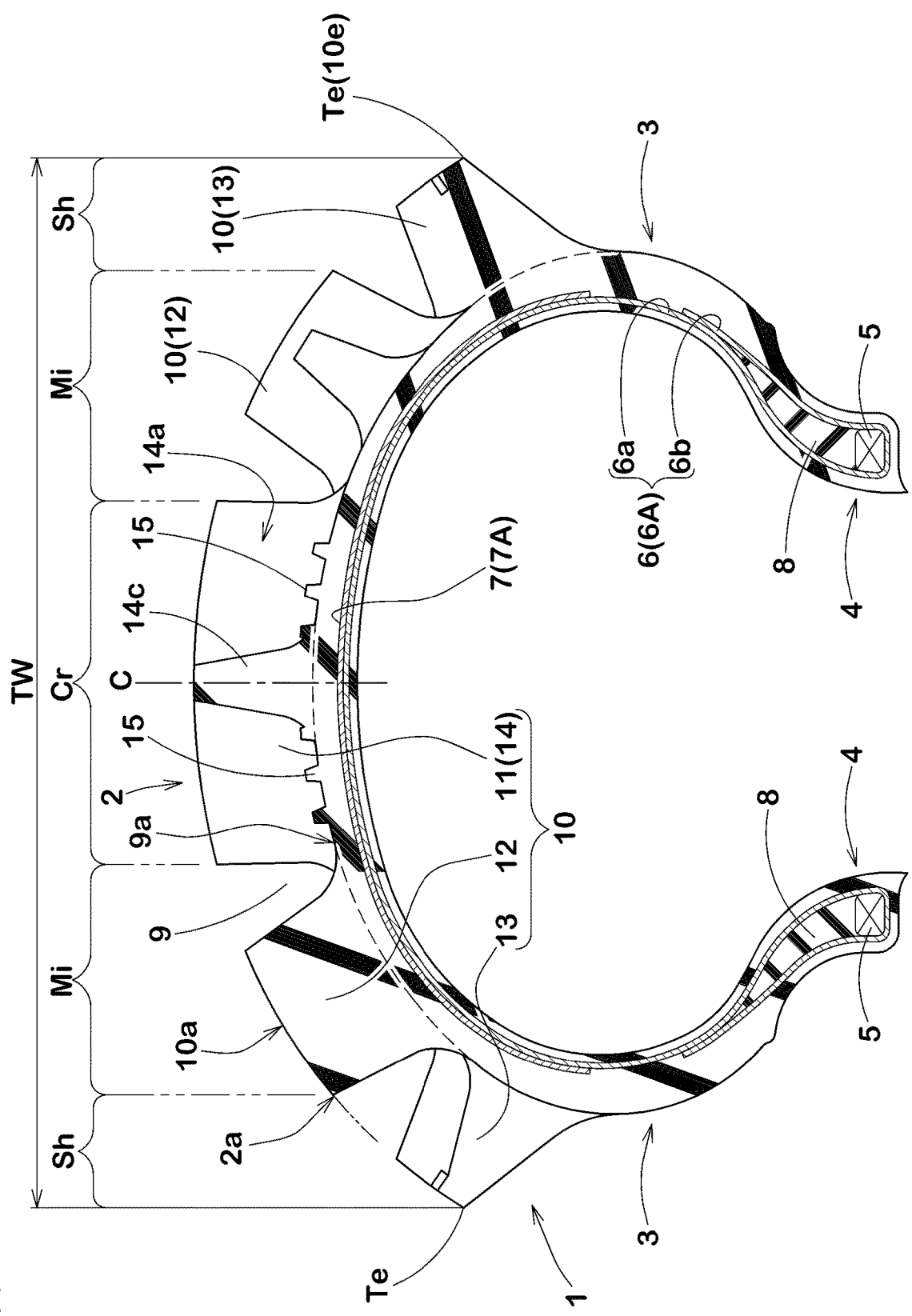
FIG. 1 illustrates a cross-sectional view of a tire for two-wheel vehicle in accordance with one embodiment of the present disclosure.
Figure 2:
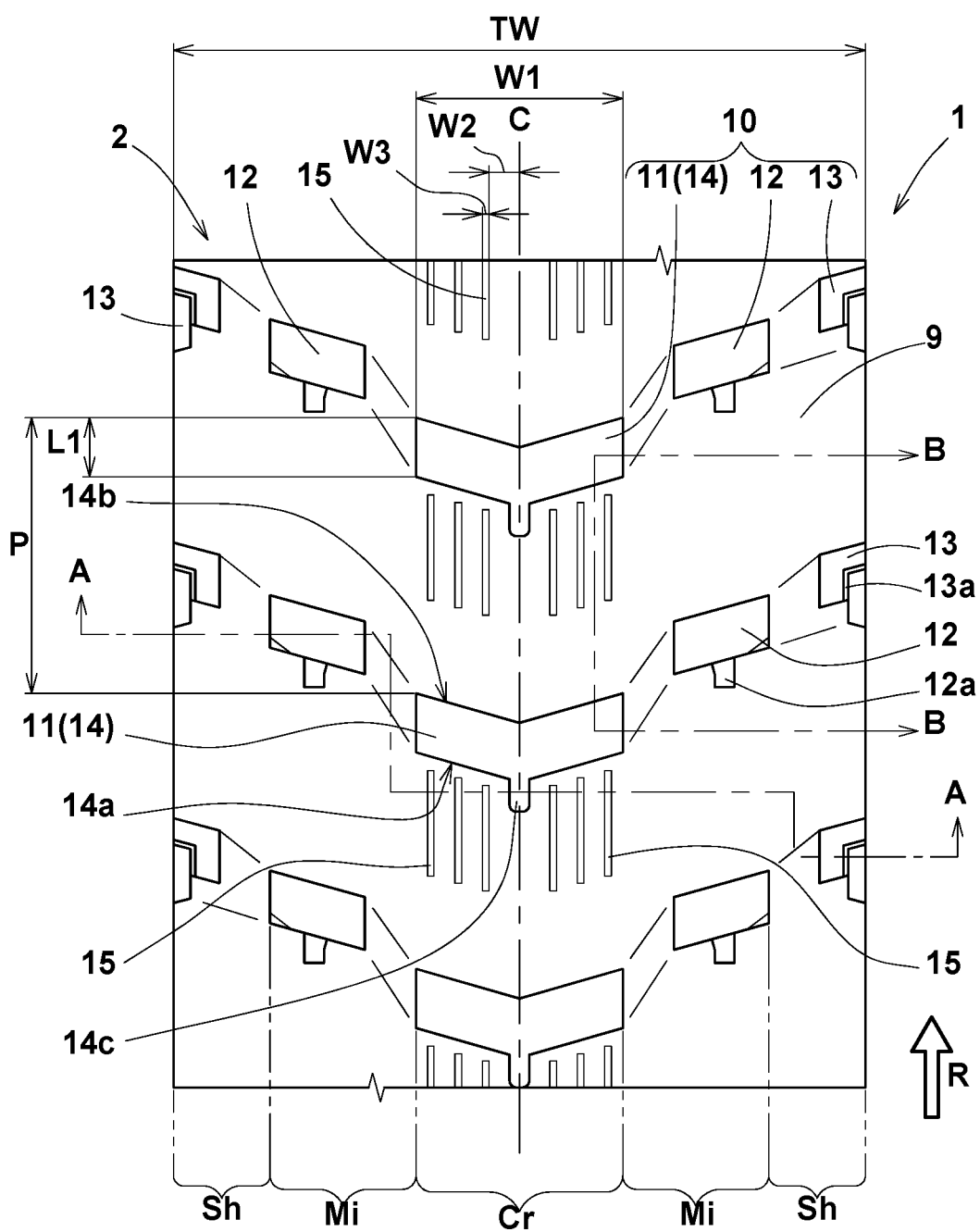
FIG. 2 is a development view of a tread portion of the tire shown in FIG. 1.

FIG. 1 illustrates a cross-sectional view of a tire for two-wheel vehicle (hereinafter, simply referred to as the "tire") 1 including a tire axis under a standard condition in accordance with the present disclosure, and FIG. 2 illustrates a development view of a tread portion 2 of the tire 1 shown in FIG. 1. FIG. 1 is a cross-sectional view taken along line A-A of FIG. 2. The tire 1, for example, may be suitably used for motorcycles which are suitably used for running on off-road, e.g., motocross and the like. The tire 1 in accordance with the present disclosure has a designated rotation direction R in order to exert the property of its tread pattern maximumly.

As used herein, the "standard condition" is such that the tire 1 is mounted on a standard wheel rim (not illustrated) with a standard pressure, but is loaded with no tire load. In this application including specification and claims, various dimensions, positions and the like of the tire 1 refer to those under the standard condition of the tire unless otherwise noted.

As used herein, the standard wheel rim is a wheel rim officially approved for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As shown in FIG. 1, the tire 1 in accordance with the present disclosure includes a carcass 6 extending between bead cores 5 each disposed in each bead portion 4 through a tread portion 2 and a pair of sidewall portions 3 and a tread reinforcing layer 7 disposed outwardly of the carcass 6 in the tire radial direction in the tread portion 2.

The carcass 6 may be configured as at least one carcass ply 6A. Preferably, the carcass 6 may be configured as a bias structure having at least two carcass plies 6A. Alternatively, the carcass 6 may be configured as a radial structure.

Preferably, the carcass ply 6A includes carcass cords oriented at angles of 15 to 45 degrees with respect to the tire equator C. For the carcass cords, an organic fiber cord such as nylon, polyester, rayon or the like may preferably be employed.

The carcass ply 6A includes a main portion 6a extending between the bead cores 5 through the tread portion 2 and the pair of sidewall portions 3 and a pair of turn-up portions 6b each turned up around the respective bead core 5.

Preferably, a tapering bead apex rubber 8 is disposed between the main portion 6a and the turn-up portion 6b in each bead portion 4. The bead apex rubber 8, for example, is made of a hard rubber composition which may reinforce each bead portion 4 effectively.

In this embodiment, the tread reinforcing layer 7 is configured as at least one reinforcing ply 7A which includes reinforcing cords oriented at angles of 5 to 40 degrees with respect to the tire equator C, for example. For the reinforcing cords, steel, aramid, rayon and the like may preferably be employed, for example.

In this embodiment, the tread portion 2 includes grooves 9 with groove bottom surfaces 9a and blocks 10 projecting from the groove bottom surfaces 9a in the tire radial direction, for example. Each groove bottom surface 9a forms the deepest area of each groove 9. The blocks 10 each include a ground contact surface 10a which forms the highest surface thereof.

An outer surface 2a of the tread portion 2 defined between tread edges Te is preferably curved in an arc-shape manner which protrudes outwardly in the tire radial direction so as to be able to obtain a sufficient area of a ground contact patch when cornering with large camber angles. In this embodiment, a tread width TW, which is an axial width between the tread edges Te of the tread portion 2, corresponds to the tire maximum width.

As used herein, the tread edges Te refer to axially both outermost edges 10e of the ground contact surfaces 10a of the blocks 10 which are located on both outermost sides in the tire axial direction.

As illustrated in FIG. 1 and FIG. 2, the tread portion 2 in accordance with the present disclosure includes a crown region Cr, a pair of middle regions Mi and a pair of shoulder regions Sh.

The crown region Cr is a region including the tire equator C, and comes into contact with the ground when straight traveling as well as cornering with small camber angles. The middle regions Mi each are regions located outwardly in the tire axial direction of the crown region Cr, and come into contact with the ground when cornering regardless of the angle of the camber. The shoulder regions Sh are regions located outwardly in the tire axial direction of the middle regions Mi, and come into contact with the ground mainly when cornering with large camber angles.

The tire 1 in accordance with the present disclosure includes a plurality of blocks 10 arranged on each of the crown region Cr, middle regions Mi and shoulder regions Sh. In some preferred embodiments, the blocks 10 of the tread portion 2 may be symmetrically arranged with respect to the tire equator C.

In some preferred embodiments, the blocks may be arranged relatively sparsely on the tread portion 2 in such a manner as to have a land ratio in a range of from 5% to 30%. When the land ratio of the tread portion 2 is less than 5%, local crack may occur on the base of some blocks upon running on hard road condition since bending moment as well as shearing force acting on each block tends to increase. Further, when the land ratio of the tread portion 2 is more than 30%, grip performance upon running on soft road condition tend to be lower since the blocks may not dig deep into the road sufficiently.

As used herein, the land ratio refers to a ratio Sb/S of a total area Sb of net ground contact surfaces of the blocks to a total area S of a gross ground contact surface of the tread portion, wherein the total area S is obtained by filling up all the grooves.

In this embodiment, the tread portion 2 is provided with a crown block row each including crown blocks 11 arranged on the crown region Cr, a pair of middle block rows including middle blocks 12 arranged on the middle regions Mi, and a pair of shoulder block rows including shoulder blocks 13 arranged on the shoulder regions Sh.

As illustrated in FIG. 2, with respect to each of the crown blocks 11, a pair of middle blocks 12 arranged nearest to the concerned crown block 11 on both sides in the tire axial direction is located forwardly in the rotation direction R of the concerned crown block 11. Further, with respect to each of the middle blocks 12, one shoulder block 13 arranged nearest to the concerned middle block is located forwardly in the rotation direction R of the concerned middle block 12. Thus, the blocks are arranged in such a manner as to form substantially a V-shaped pattern which includes repeated units with one crown block 11, a pair of middle blocks 12 and a pair of shoulder blocks 13. This tread pattern may improve transient characteristic upon cornering where the tread ground contact patch shifts to a different position in the tire axial direction.

In this embodiment, the crown blocks 11 include at least one, preferably a plurality of V-shaped blocks 14 having an axial center portion located rearwardly in the rotation direction R with respect to its axial both end portions such that a ground contact surface forms a V-shape. Preferably, the center portions of the V-shaped blocks 14 are arranged on the tire equator C. Such V-shaped blocks 14 may mitigate its stress variation upon grounding. Thus, the tire 1 with the V-shaped blocks 14 may improve driving performance on soft roads.

In this embodiment, the middle blocks 12 each include a ground contact surface formed into a rectangular shape. Preferably, the middle blocks 12 each may have a projection 12a projecting locally rearwardly in the rotation direction R. Each projection 12a can support the middle block 12 from a rear side in the rotation direction R. Such middle blocks 12 may be useful to increase traction by suppressing large deformation of rearward in the rotation direction R.

In this embodiment, the shoulder blocks 13 each have ground contact surface formed into substantially a hexagonal shape. Preferably, the shoulder blocks 13 each may be provided with an L-shaped shoulder sipe 13a. The shoulder sipe 13a may improve cornering performance with large camber angles by optimizing rigidity of the shoulder blocks 13.

Preferably, in each of the V-shaped blocks 14, a width W1 in the tire axial direction may be greater than a length L1 thereof in the tire circumferential direction. Preferably, the width W1 of the V-shaped block 14 may be in a range of from 20% to 40% of the tread width TW. Further, the length L1 may preferably be in a range of from 15% to 30% of pitches P of the crown blocks 11 in the tire circumferential direction.

The V-shaped blocks 14 as such may deliver high stability upon grounding as well as better transient characteristic upon cornering. The V-shaped blocks 14 may also deliver powerful traction on soft road due to long edge lengths in the tire axial direction.

Figure 3:
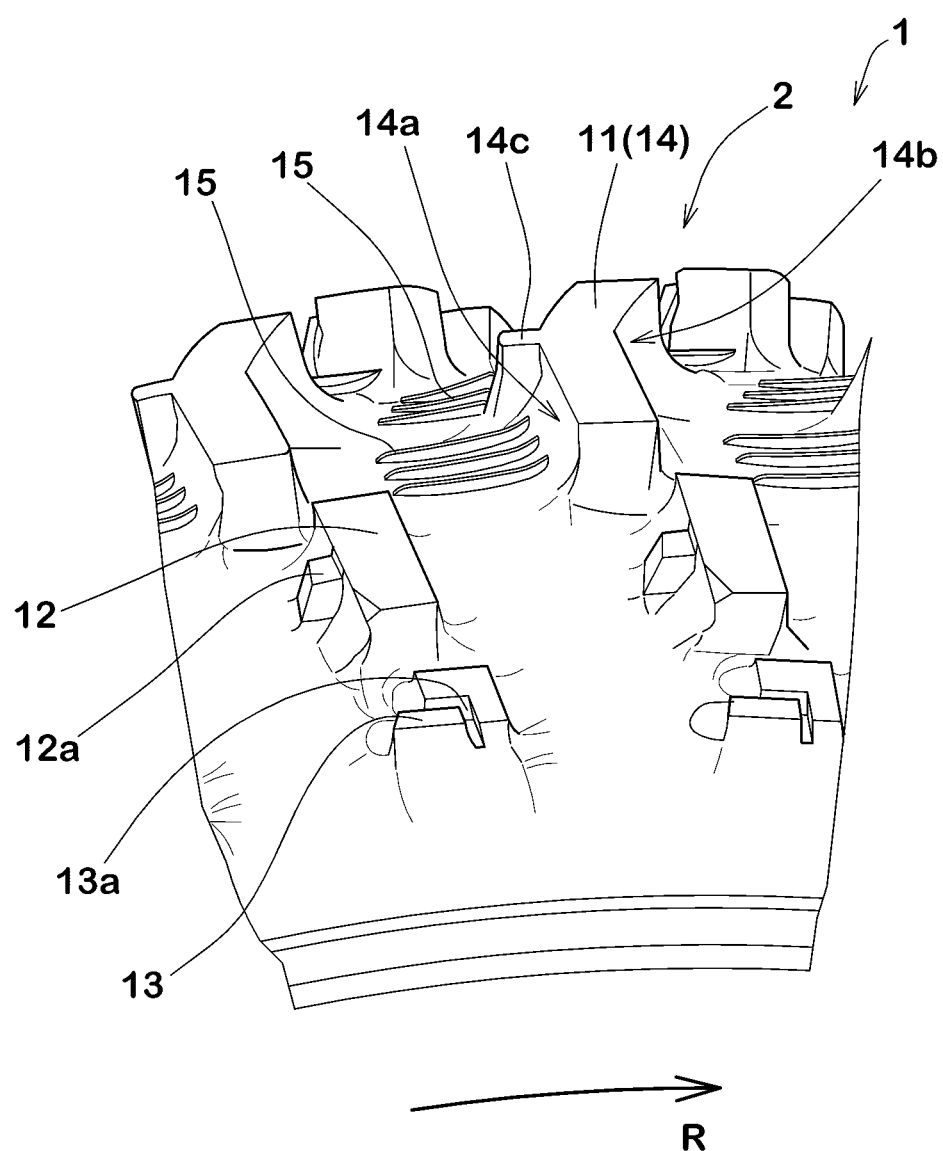
FIG. 3 is a partial perspective view of the tread portion of the tire shown in FIG. 1.

FIG. 3 illustrates a partial enlarged view of the tread portion 2 in FIG. 1. As illustrated in FIGS. 1 to 3, each of the V-shaped blocks 14 preferably includes a first sidewall 14a located rearwardly in the rotation direction R and a second sidewall 14b located forwardly in the rotation direction R. The V-shaped blocks 14 each may preferably include a keel portion 14c projecting rearwardly in the rotation direction R from a center portion of the first sidewall 14a. In this embodiment, the keel portion 14c is located on the tire equator C.

The V-shaped blocks 14 may suppress wobbling in right and left of the tire on soft terrain since the keel portions 14c dig into and split the ground, resulting in better directional control and stability in straight traveling. Further, since the keel portions 14c are provided on the rear side of the V-shaped blocks in the rotation direction R, the keel portions 14c are strongly forced onto the ground upon braking, leading to better braking performance.

Furthermore, since the keel portions 14c are integrally provided on the V-shaped blocks 14, rigidity of the blocks in the tire axial direction may be preferably maintained. Thus, the keel portions 14c do not bend down in left and right directions, leading to improve stability in straight traveling as well as braking performance. Furthermore, since the keel portions 14c support the V-shaped blocks 14 from the rear side in the rotation direction R, large deformation of the V-shaped block 14 rearwardly upon grounding can be suppressed, and therefore it may be useful to increase traction.

In this embodiment, the groove bottom surfaces 9a of the grooves 9 connected to the first sidewalls 14a of the V-shaped blocks 14 are provided with a plurality of ribs 15 which extend in the tire circumferential direction. In some preferred embodiments, each of the ribs 15 may be formed into a thin plate shaped manner. Further, in some preferred embodiments, at least one, preferably a plurality of ribs 15 may be provided on each side of the keel portions 14c in the tire axial direction. Further, in some preferred embodiments, at least six ribs 15 may be provided on each of the groove bottom surfaces 9a connected to each V-shaped blocks 14.

Such ribs 15 located rearwardly of the V-shaped blocks 14 in the rotation direction R reinforce base portions of the V-shaped blocks 14, and thus large deformation of the V-shaped blocks 14 rearwardly in the rotation direction R upon grounding can be suppressed. Consequently, the ribs 15 may reduce strain to be generated on the base portions of the V-shaped blocks 14 to suppress chipping away of the V-shaped blocks 14, leading to improved durability of the tire 1.

The chipping of the V-shaped block 14, for example, may also be suppressed by employing a rubber composition with low elastic modulus as the tread portion 2. When the tread portion 2 is formed of a rubber composition with low elastic modulus, the V-shaped blocks 14 may potentially be pushed toward the groove bottom surfaces 9a of the grooves upon grounding. At that time, strain to be generated on the base portions of the V-shaped blocks 14 may be reduced by deformation of the groove bottom surfaces 9a of the grooves.

On the other hand, the deformation of bottom surfaces 9a leads to fatigue deterioration of the grooves 9 which may deteriorate durability of the tire 1. The ribs 15 formed on the groove bottom surfaces 9a may increase rigidity of the grooves 9 to prevent the V-shaped blocks 14 from being pushed excessively toward the groove bottom surfaces 9a. Thus, even when the tread portion 2 is made of a rubber composition with a low elastic modulus, deformation of the groove bottom surfaces 9a may be suppressed, leading to improve durability of the tire 1.

As illustrated in FIG. 2, in some preferred embodiments, a distance W2 in the tire axial direction between the tire equator C and the axially innermost arranged rib 15 may be equal to or more than 15% of the widths W1 of the V-shaped blocks 14. Each width W3 in the tire axial direction of ribs 15 may be in a range of from 2% to 10% of the widths W1 of the V-shaped blocks 14. Such ribs 15 may suppress effectively that the V-shaped blocks 14 bend down and that the V-shaped blocks 14 are pushed toward the groove bottom surfaces 9a excessively.

Figure 4:
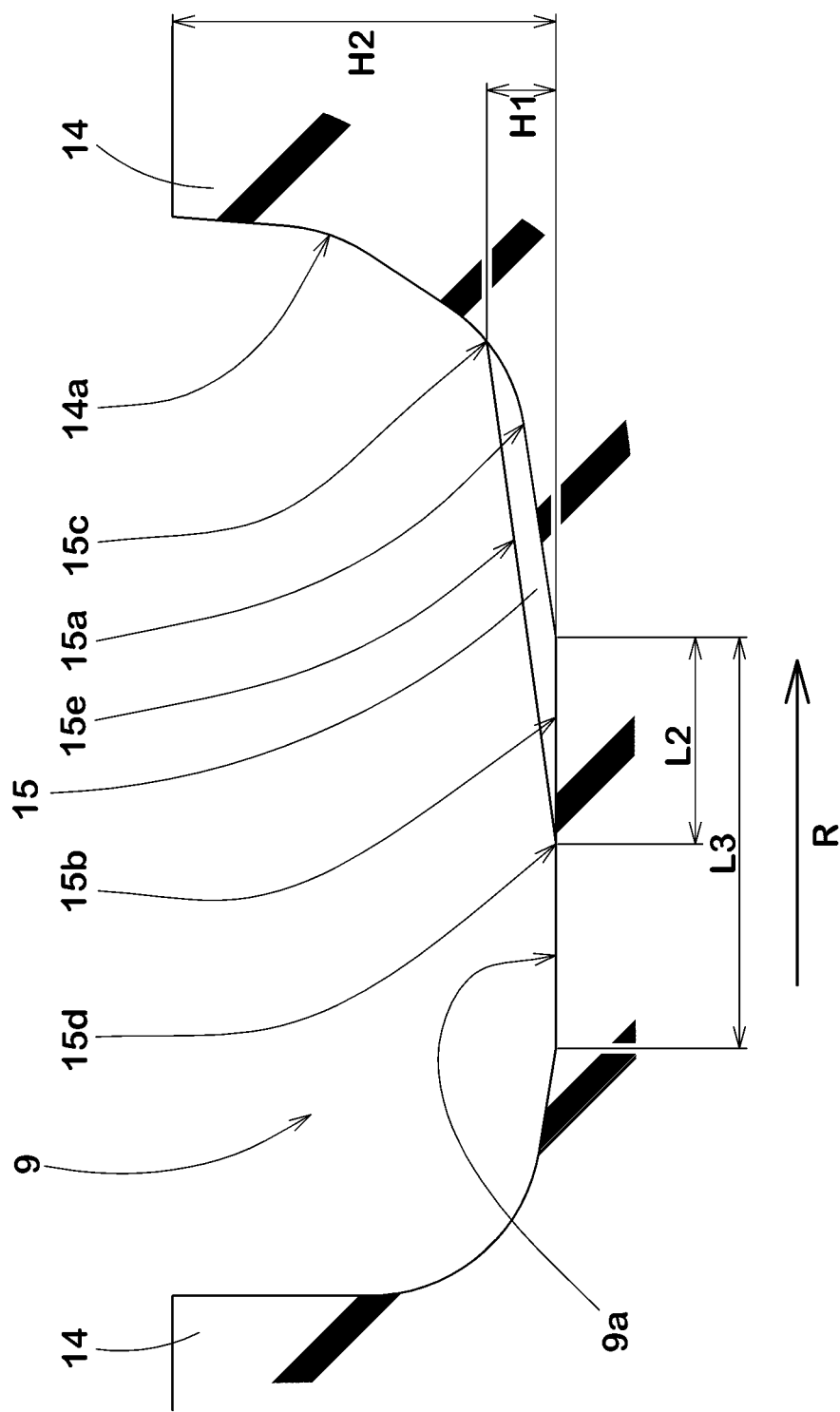
FIG. 4 is a cross-sectional view taken along line B-B shown in FIG. 2.

FIG. 4 illustrates a cross-sectional view taken along line B-B of FIG. 2. As illustrated in FIG. 4, each of the ribs 15 in accordance with the present embodiment extends from the first sidewall 14a of one of the V-shaped blocks 14 rearwardly in the rotation direction R, and terminates on the groove bottom surface 9a. Preferably, each of the ribs 15 includes a first connected portion 15a connected to the first sidewall 14a and a groove-bottom connected portion 15b connected to the groove bottom surface 9a.

In each rib 15, the first connected portion 15a, for example, includes a front end 15c in the rotation direction R. In this embodiment, a height H1 in the tire radial direction from the groove bottom surface 9a to the front end 15c corresponds to the maximum height of the rib 15 from the groove bottom surface 9a. Preferably, the height H1 may be in a range of from 5% to 30% of the block height H2 of the V-shaped block 14 from the groove bottom surface 9a.

When the height H1 is less than 5% of the block height H2, the effect which prevents the V-shaped block 14 from bending down upon grounding may be lowered. When the height H1 is more than 30% of the block height H2, rigidity of the V-shaped block 14 tends to increase, leading to poor impact absorbing property.

In each rib 15, the groove-bottom connected portion 15b, for example, includes a rear end 15d in the rotation direction R. Preferably, the groove-bottom connected portion 15b may have a length L2 in the tire circumferential direction in a range of from 10% to 100% of a length L3 of the groove bottom surface 9a in the tire circumferential direction. When the length L2 in the tire circumferential direction is less than 10% of the length L3 in the tire circumferential direction, the effect which prevents the V-shaped block 14 from bending down upon grounding may be lowered.

In this embodiment, each of the ribs 15 includes a top surface 15e in the tire radial direction, and the top surface 15e is formed in such a manner that the top surface 15e extends in a straight manner connecting the front end 15c and the rear end 15d. Such ribs 15 may improve rigidity of the grooves 9 so as to prevent effectively the V-shaped blocks 14 from bending down.

Figure 5:
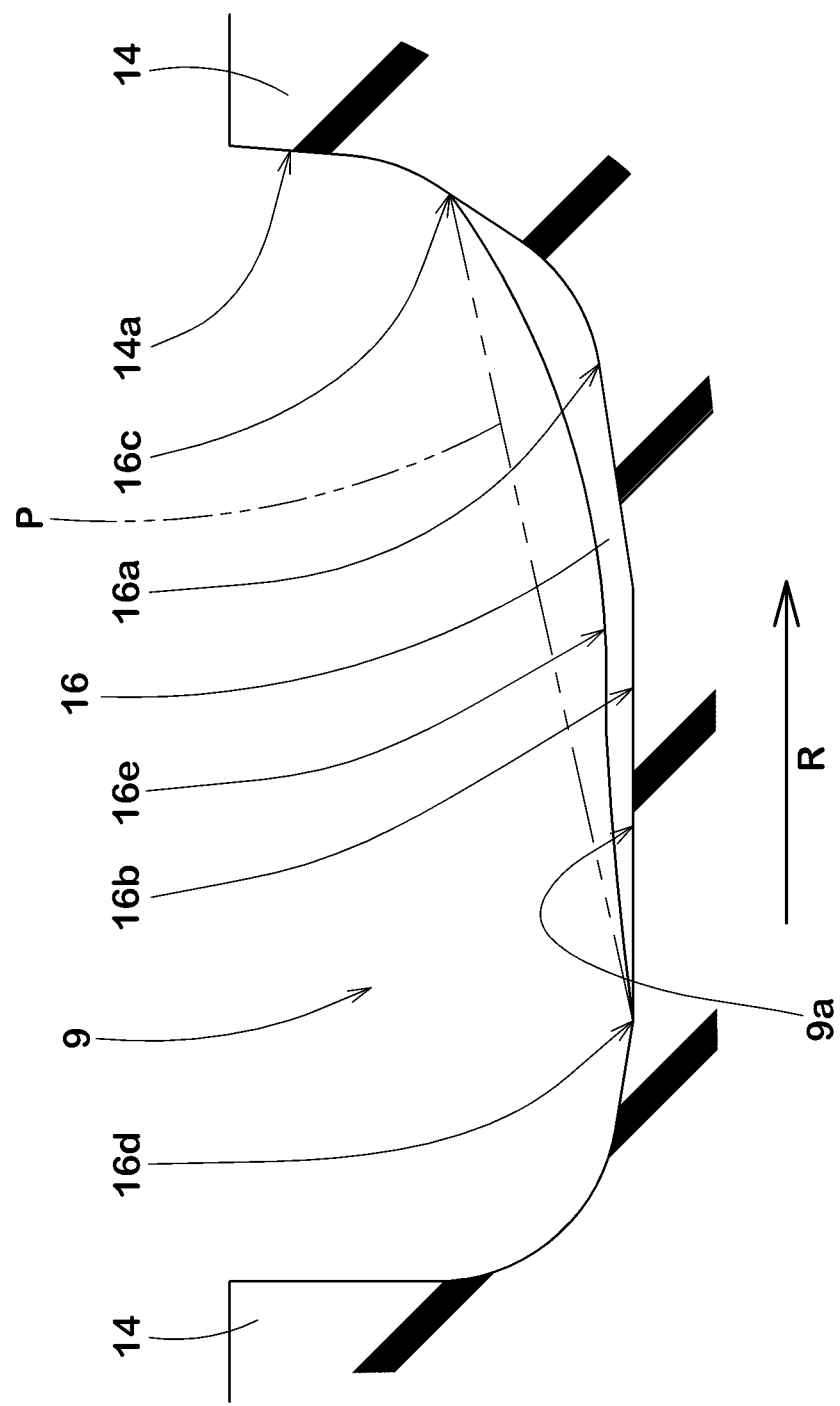
FIG. 5 is a cross-sectional view of a rib in accordance with another embodiment.

FIG. 5 illustrates a cross-sectional view of another embodiment of the ribs 16 similar to FIG. 4. As illustrated in FIG. 5, each of the ribs 16 in accordance with the embodiment extends from the first sidewall 14a of one of the V-shaped blocks 14 rearwardly in the rotation direction R, and terminates on the groove bottom surface 9a. Preferably, each of the ribs 16 includes a first connected portion 16a connected to the first sidewall 14a and a groove-bottom connected portion 16b connected to the groove bottom surface 9a.

The first connected portion 16a, for example, includes a front end 16c in the rotation direction R. The groove-bottom connected portion 16b, for example, includes rear end 16d in the rotation direction R. In this embodiment, each of the ribs 16 includes a top surface 16e in the tire radial direction, and the top surface 16e is formed in such a manner that the top surface 16e extends inwardly in the tire radial direction with respect to a virtual plane P connecting the front end 16c and the rear end 16d. In this embodiment, the top surface 16e is formed as a concave shape with respect to the virtual plane P. Such a rib 16 may improve rigidity of the grooves 9 so as to prevent effectively the V-shaped block 14 from bending down.

Figure 6:
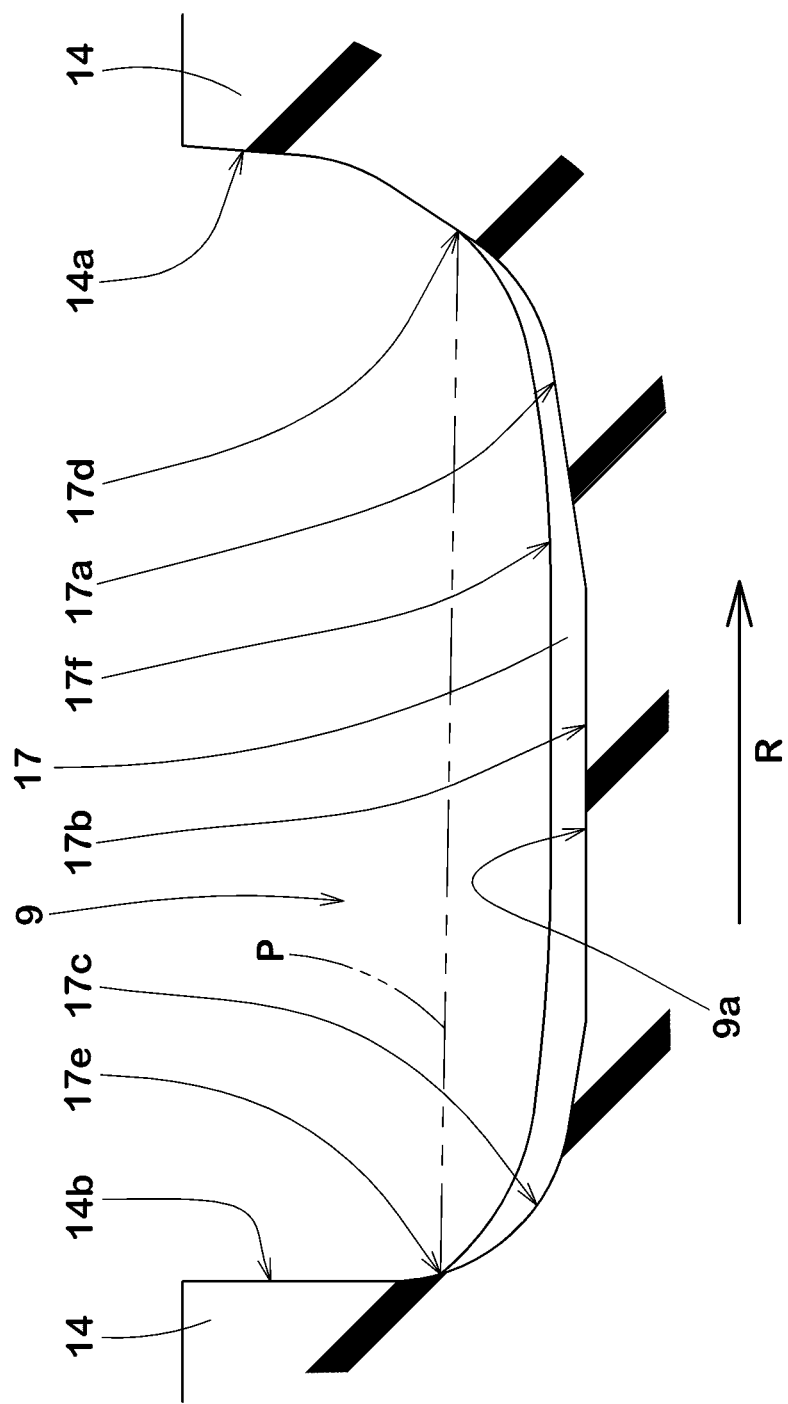
FIG. 6 is a cross-sectional view of a rib in accordance with another embodiment.

FIG. 6 illustrates a cross-sectional view of yet another embodiment of the ribs 17 similar to FIG. 4. As illustrated in FIG. 6, each of the ribs 17 in accordance with the embodiment extends from the first sidewall 14a of one V-shaped block 14 to the second sidewall 14b of the other one V-shaped block 14 located backwardly of said one V-shaped block 14 in the rotation direction R. Preferably, each rib 17 includes a first connected portion 17a connected to the first sidewall 14a, a groove-bottom connected portion 17b connected to the groove bottom surface 9a and a second connected portion 17c connected to the second sidewall 14b.

The first connected portion 17a, for example, includes a front end 17d in the rotation direction R. The second connected portion 17c, for example, includes a rear end 17e in the rotation direction R. Each of the ribs 17 includes a top surface 17f in the tire radial direction, and the top surface 17f is formed in such a manner that the top surface 17f extends inwardly in the tire radial direction with respect to a virtual plane P connecting the front end 17d and the rear end 17e. In this embodiment, the top surface 17f is formed as a concave shape with respect to the virtual plane P. Such a rib 17 may improve rigidity of the groove 9 so as to prevent effectively both V-shaped blocks 14 from bending down. Alternatively, the top surface 17f may be formed in a straight manner connecting the front end 17d and the rear end 17e, i.e., corresponding to the virtual plane P.

While the particularly preferable embodiments in accordance with the present invention have been described in detail, the present invention is not limited to the illustrated embodiments, but can be modified and carried out in various aspects.

Example

Two-wheel vehicle bias tires having the basic structure shown in FIG. 1 and the block arrangement shown in FIG. 2 were manufactured based on the details shown in Table 1. Then, each of these tires was mounted on a rear wheel of a test vehicle to test its performance.

The common specification of each tire and test methods are follows.

Test vehicle: motorcycle with displacement of 450 cc
Tire size: 110/90-19
Rim size: 2.15×19
Inner pressure: 80 kPa
Test for Rigidity of Grooves:

A test rider drove the motorcycle equipped with each test tire on a test course of rough terrain section having series of small bumps, and then flexure amount of the tread portion upon grounding, on bumps was evaluated by rider's sense as rigidity of the grooves of each test tire. The test results are shown in Table 1 using a point system (10 points maximum), wherein the larger the value means the smaller the flexure amount, i.e., better performance.

Test for Deformation of Blocks:

The test rider drove the motorcycle equipped with each test tire on the above test course, and then deformation amount of the blocks upon grounding on bumps was evaluated by rider's sense as deformation of the blocks of each test tire. The test results are shown in Table 1 using a point system (10 points maximum), wherein the larger the value means the smaller the deformation, i.e., better performance.

Test for Grip Feeling:

The test rider drove the motorcycle equipped with each test tire on a test course of rough terrain curved section, and then degree of lateral slide of the motorcycle upon cornering on the curved section was evaluated by rider's sense as grip feeling of each test tire. The test results are shown in Table 1 using a point system (10 points maximum), wherein the larger the value means the smaller the degree of slide, i.e., better performance.

Test for Ground Contacting Feeling:

The test rider drove the motorcycle equipped with each test tire on a test course of rough terrain straight section, and then degree of bumping of the motorcycle upon braking was evaluated by rider's sense as ground contacting feeling of each test tire. The test results are shown in Table 1 using a point system (10 points maximum), wherein the larger the value means the smaller the degree of bumping, i.e., better performance.

Test for Rigidity Feeling:

The test rider drove the motorcycle equipped with each test tire on the test course of rough terrain section having series of small bumps, and then flexure amount of the entire tread portion upon being separating from bumps was evaluated by rider's sense as rigidity feeling of each test tire. The test results are shown in Table 1 using a point system (10 points maximum), wherein the larger the value means the smaller the flexure amount, i.e., better performance.

Test for Traction Property:

The test rider drove the motorcycle equipped with each test tire on the test course of rough terrain curved section, and then acceleration property of the motorcycle at an exit of a corner on the curved section was evaluated by rider's sense as traction property of each test tire. The test results are shown in Table 1 using a point system (10 points maximum), wherein the larger the value means the higher acceleration, i.e., better performance.

Test for Absorbing Property:

The test rider drove the motorcycle equipped with each test tire on the test course of rough terrain straight section, and then degree of bumping of the motorcycle upon braking was evaluated by rider's sense as absorbing property of each test tire. The test results are shown in Table 1 using a point system (10 points maximum), wherein the larger the value means the higher absorbing property, i.e., better performance.

Table 1 shows the test results.

TABLE 1

|  | Ref. 1 | Ex. 1 | Ex. 2 | Ex. 3 | Ex. 4 | Ex. 5 |
|---|---|---|---|---|---|---|
| Ribs | none | presence | presence | presence | presence | presence |
| Ratio H1/H2 (%) | 0 | 20 | 3 | 50 | 20 | 20 |
| Ratio L2/L3 (%) | 0 | 40 | 40 | 40 | 20 | 100 |
| Rigidity of grooves (score) | 4 | 6 | 6 | 6 | 4 | 6 |
| Deformation of blocks (score) | 4 | 6 | 4 | 6 | 6 | 6 |
| Gripe feeling (score) | 5 | 6 | 5 | 5 | 5 | 5 |
| Ground contacting feeling (score) | 5 | 6 | 5 | 4 | 5 | 5 |
| Rigidity feeling (score) | 4 | 6 | 6 | 6 | 4 | 6 |
| Traction (score) | 5 | 6 | 5 | 5 | 5 | 5 |
| Absorbing property (score) | 5 | 6 | 5 | 4 | 5 | 5 |

From the test results, it is confirmed that the example tires improve each performance in a well-balanced manner, and which is capable improving cornering performance as well as durability as compared with the comparative example tires.

What is claimed is:

1. A tire for two-wheel vehicle, the tire comprising:
   a tread portion having a designated rotation direction and being provided with a plurality of blocks and grooves;
   the plurality of blocks comprising at least one V-shaped block having an axial center portion located rearwardly in the rotation direction with respect to both its axial end portions and a first sidewall located rearwardly in the rotation direction; and
   the plurality of grooves comprising at least one groove having a groove bottom surface connected to the first sidewall,
   wherein
   the groove bottom surface is provided with ribs extending in a tire circumferential direction,
   the ribs each comprise a rib top surface in a tire radial direction,
   the rib top surface extends from a rib front end to a rib rear end in the rotation direction,
   the rib front end is at a position that is connected to the first sidewall,
   the rib rear end is at a position that is connected to the groove bottom surface,
   in a tire side view, the rib top surface extends in a straight manner from the rib front end to the rib rear end, and each rib has a groove-bottom connected portion with a length L2 in the tire circumferential direction that is in a range of 40% to 100% of a length L3 of the groove bottom surface in the tire circumferential direction.

2. The tire according to claim 1,
   the at least one V-shaped block further comprising a keel portion projecting rearwardly in the rotation direction from the axial center portion, and
   the ribs arranged such that one or some of the ribs exist on each side of the keel portion in a tire axial direction.

3. The tire according to claim 1, wherein the ribs comprise at least six ribs on the groove bottom surface.

4. The tire according to claim 3, wherein the rib front ends of two adjacent ribs of the ribs in a tire axial direction are arranged in different locations from one another in the tire circumferential direction.

5. The tire according to claim 4, wherein the rib of the two adjacent ribs that is nearer to a tire equator has the rib front end located rearward in the rotation direction with respect to other ribs of the ribs.

6. The tire according to claim 1, wherein the ribs each have a maximum height from the groove bottom surface in a range of from 5% to 30% of a height of the at least one V-shaped block from the groove bottom surface.

7. The tire according to claim 1, wherein the at least one V-shaped block comprises a plurality of V-shaped blocks located on a crown region of the tread portion, and constitute a crown block row of crown blocks.

8. The tire according to claim 7, wherein the plurality of blocks comprises
   a pair of middle block rows each comprising middle blocks and arranged outwardly in a tire axial direction of a respective side of the crown block row,
   a pair of shoulder block rows each comprising shoulder blocks arranged outwardly in the tire axial direction of a respective middle block row,
   with respect to each of the crown blocks, each of the middle blocks which is arranged nearest to the concerned crown block is located forwardly in the rotation direction relative to the concerned crown block, and
   with respect to each of the middle blocks, one of the shoulder blocks arranged nearest to the concerned middle block is located forwardly in the rotation direction relative to the concerned middle block.

9. The tire according to claim 1, wherein a distance W2 in a tire axial direction between a tire equator and an axially innermost arranged rib of the ribs is equal to or more than 15% of a width W1 in the tire axial direction of the at least one V-shaped block.

10. The tire according to claim 9, wherein a width W3 in the tire axial direction of each rib is in a range from 2% to 10% of the width W1 of the at least one V-shaped block.

11. The tire according to claim 1, wherein the rib front ends of two adjacent ribs of the ribs in a tire axial direction are arranged in different locations from one another in the tire circumferential direction.

12. The tire according to claim 1, wherein a height H1 in the tire radial direction from the groove bottom surface to the rib front end is smaller than a length of the rib top surface.

13. The tire according to claim 1, wherein a height H1 in the tire radial direction from the groove bottom surface to the rib front end is smaller than the length L2.

14. The tire according to claim 1, wherein the length L2 is in a range of 50% to 100% of the length L3.

15. The tire according to claim 1, wherein the length L2 is in a range of 60% to 100% of the length L3.

16. The tire according to claim 1, wherein the length L2 is equal to the length L3.

* * * * *